US007071412B2

(12) United States Patent
Dittes et al.

(10) Patent No.: US 7,071,412 B2
(45) Date of Patent: Jul. 4, 2006

(54) FLUID-TIGHT CABLE DUCT

(75) Inventors: Reinhold Dittes, Bretten (DE); Andreas Kainz, Leingarten (DE)

(73) Assignee: era-contact GmbH, Bretten (DE)

(*) Notice: Subject to any disclaimer, the term of this patent is extended or adjusted under 35 U.S.C. 154(b) by 0 days.

(21) Appl. No.: 10/519,520

(22) PCT Filed: Jul. 3, 2003

(86) PCT No.: PCT/EP03/07134

§ 371 (c)(1), (2), (4) Date: Jun. 23, 2005

(87) PCT Pub. No.: WO2004/006401

PCT Pub. Date: Jan. 15, 2004

(65) Prior Publication Data

US 2006/0032656 A1 Feb. 16, 2006

(30) Foreign Application Priority Data

Jul. 3, 2002 (DE) ................................ 202 10 296

(51) Int. Cl.
*H02G 3/18* (2006.01)

(52) U.S. Cl. ............................... 174/65 G; 174/65 SS; 174/652; 174/151; 174/135; 248/56; 16/2.1

(58) Field of Classification Search .............. 174/65 G, 174/135, 65 SS, 153, 65 R, 151; 248/56; 16/2.1, 2.2

See application file for complete search history.

(56) References Cited

U.S. PATENT DOCUMENTS

| | | | | |
|---|---|---|---|---|
| 5,278,357 | A | 1/1994 | Yamanashi | |
| 5,561,273 | A * | 10/1996 | Yamanashi .............. | 174/152 R |
| 5,614,696 | A * | 3/1997 | Oakes ...................... | 174/65 G |
| 6,150,607 | A * | 11/2000 | Weyl et al. ............... | 174/65 G |
| 6,936,770 | B1 * | 8/2005 | Takedomi et al. ........ | 174/65 G |
| 6,963,030 | B1 * | 11/2005 | Matsui et al. ............. | 174/65 G |
| 2004/0144555 | A1 * | 7/2004 | Buekers et al. ........... | 174/65 G |

FOREIGN PATENT DOCUMENTS

| | | |
|---|---|---|
| DE | 32 32 050 A1 | 3/1983 |
| DE | 196 21 321 A1 | 12/1997 |
| DE | 200 09 530 U1 | 10/2000 |
| DE | 202 10 296 U1 | 10/2002 |
| EP | 1 158 636 A2 | 11/2001 |

* cited by examiner

*Primary Examiner*—Dhiru R. Patel
(74) *Attorney, Agent, or Firm*—McCormick, Paulding & Huber LLP

(57) ABSTRACT

The invention relates to a fluid-tight, in particular oil-tight, cable duct (10) with a duct body (12), includes an inner side (16), exposed to a fluid, an external side (18) separated from the fluid and at least one cable channel (20), through which at least one electrical line (14) formed by a flex is run from the inner side (16) to the outer side (18) of the duct body (12). A seal element (22) is arranged in the cable channel (20) with a number of individual channels (32) passing therethrough which corresponds to the number of lines and through which the lines (14) run individually. The lines (14) are each formed from two line sections, connected by an electrically-conducting connector piece (50) with a solid cross-section, whereby the connector piece (50) is housed within the single channel of the sealing element (22), at least over a part of the length thereof.

12 Claims, 3 Drawing Sheets

14
34
56
22
23
32
54
50
52
54

FLUID-TIGHT CABLE DUCT

CROSS-REFERENCE TO RELATED APPLICATIONS

This application claims the benefit of International Application No. PCT/EP2003/007134, filed on Jul. 3, 2003, which claims the benefit of German Patent Application No. DE 202 10 296.3, filed on Jul. 3, 2002, the disclosures of which are hereby incorporated by reference in their entireties.

FIELD OF THE INVENTION

The present invention concerns a fluid-tight, especially an oil-tight, cable duct with a duct body having an inner side exposed to a fluid, an outer side separated from the fluid and at least one cable channel through which at least one electrical conductor formed by a strand is guided from the inner side of the duct body to the outer side of the duct body.

BACKGROUND OF THE INVENTION

One such cable duct is known from utility model DE 200 09 530. The cable duct shown therein serves, for example, to guide electrical conductors in an oil sealed manner from the interior of a motor or drive housing to the outside. The illustrated cable duct includes a duct body, designed to close an opening in the motor or drive housing, wherein the inner side of the duct body is exposed to oil. In the duct body is formed at least one cable channel connecting its inner and outer sides, through which channel an electrical conductor is guided, whose outer insulation over a portion of the length of the cable channel is replaced by a hardened plastic sealing material. The plastic sealing material is supposed to prevent oil from escaping through the cable channel from the inner side of the duct body to the outer side.

It has, however, been shown that the cable duct described in the above mentioned publication is not entirely oil tight. For one thing, hot and therefore very thinly fluid oil can penetrate by capillary effect into the interior of the stranded conductor and can move through the cable channel in the conductor interior. For another thing, the sealing mass as a result of an aging process tends to shrink so that a gap can form between the conductor and the sealing material or between the sealing material and the cable channel wall, through which gap the oil likewise can move from the inner side of the duct body to the outer side.

SUMMARY OF THE INVENTION

The invention has as its object the provision of a cable duct of the aforementioned kind, the fluid tightness of which cable duct is improved in comparison to the state of the art.

This object, in a cable duct of the previously mentioned kind, is solved in that a sealing element is arranged in the cable channel which element is penetrated by a number of individual channels corresponding to the number of conductors, through which individual channels the conductors are individually guided, and in that each of the conductors consists of two conductor sections which are connected by an electrical conducting connecting piece which along at least a portion of its length has a solid cross section, with the connecting piece at least along a portion of its length being brought into the corresponding individual channel of the sealing element. Because of this solid cross section, oil can not move through the interior of the connecting piece. Contrary to the state of art where the oil can seep through a stranded conductor from the inner side of the duct body to the outer side, the oil found in the interior of a stranded conductor in the case of the cable duct of the invention cannot move past the connecting piece. Since the connecting piece also has at least a portion of its length inserted into the individual channel of the sealing element no oil can move past the outside of the connecting piece.

The connecting piece is preferably made of a pin, at each of the two ends of which pin a crimping sleeve is arranged. By means of such a connecting piece, the two conductor sections can be simply and cost effectively connected with one another.

The sealing element consists preferably of an elastomer. An elastomer has better sealing properties than a poured material mass as is used in the state of the art, because the poured material mass shrinks as the result of an aging process. However, the cables with a poured mass can be held in a more secure position than is achieved by the mere elastic surrounding in the individual channels of the sealing element. Therefore, the cable channel, in a preferred development and in a section adjacent to the inner side of the sealing element, is filled with a poured material mass so that the conductors are held tensionally fast in their positions. Moreover, the filled section offers a coarse sealing which already holds a large portion of the fluid away from the sealing element.

Preferably, the filled inner section of the cable channel—as viewed in the axial direction from outside to inside—narrows in at least one place. Therefore, it is assured that the filling material can not fall from the cable channel. even if it shrinks as a result of an aging process. Further a first recess is preferably formed in the cable channel, from which recess an annular web extends in the axial direction into the filled section of the cable channel. By means of this annular web, the filling material—with reference to the cable channel axis—is divided into a radially inner section and a radially outer section. In the course of the aging of the filling material, the radially outer section shrinks onto the annular web. Thereby on one hand, a formation of a gap between the radially outer section of the filling material and the annular web, and on the other hand, a too pronounced shrinking of the filling material as a whole is avoided so that it can not be entirely loosened from the cable channel 20.

Preferably each of the individual channels of the sealing element has at least one narrowed section. In the narrowed section there results an especially good sealing between the conductor and the sealing element. Further the narrowed section hinders the penetration of rain or sprayed water from outwardly into the sealing element, which could lead to short circuiting of different conductors.

Preferably, the sealing element has a tapered section and the cable channel—as seen in the axial direction form outwardly toward inwardly—has a narrowing section into which the sealing element from outwardly is pressed with its tapered section. Further the sealing element preferably has on its axially outwardly facing end a radially outwardly projecting section, and a second recess is formed in the cable channel into which this projecting section is received. In a preferred further development, a cable channel axis surrounding closed sealing lip is formed in the recess.

Preferably the cable duct has further a cable guide tube with a flange for the fastening of itself to the outside of the duct body, with the internal diameter of the flange being smaller than the diameter of the projecting section of the sealing element. Therefore upon the fastening of the cable guide tube through the use of the flange the sealing element is pressed into the cable channel which again leads to an improved seal. Preferably, further a cable channel axis surrounding closed sealing lip is formed on the flange.

Further advantages and features of the solution of the invention will be apparent from the following description in which the invention is explained by way of an exemplary embodiment with reference to the accompanying drawings. The drawings are:

DETAILED DESCRIPTION OF THE PREFERRED EMBODIMENT

Figure 1:
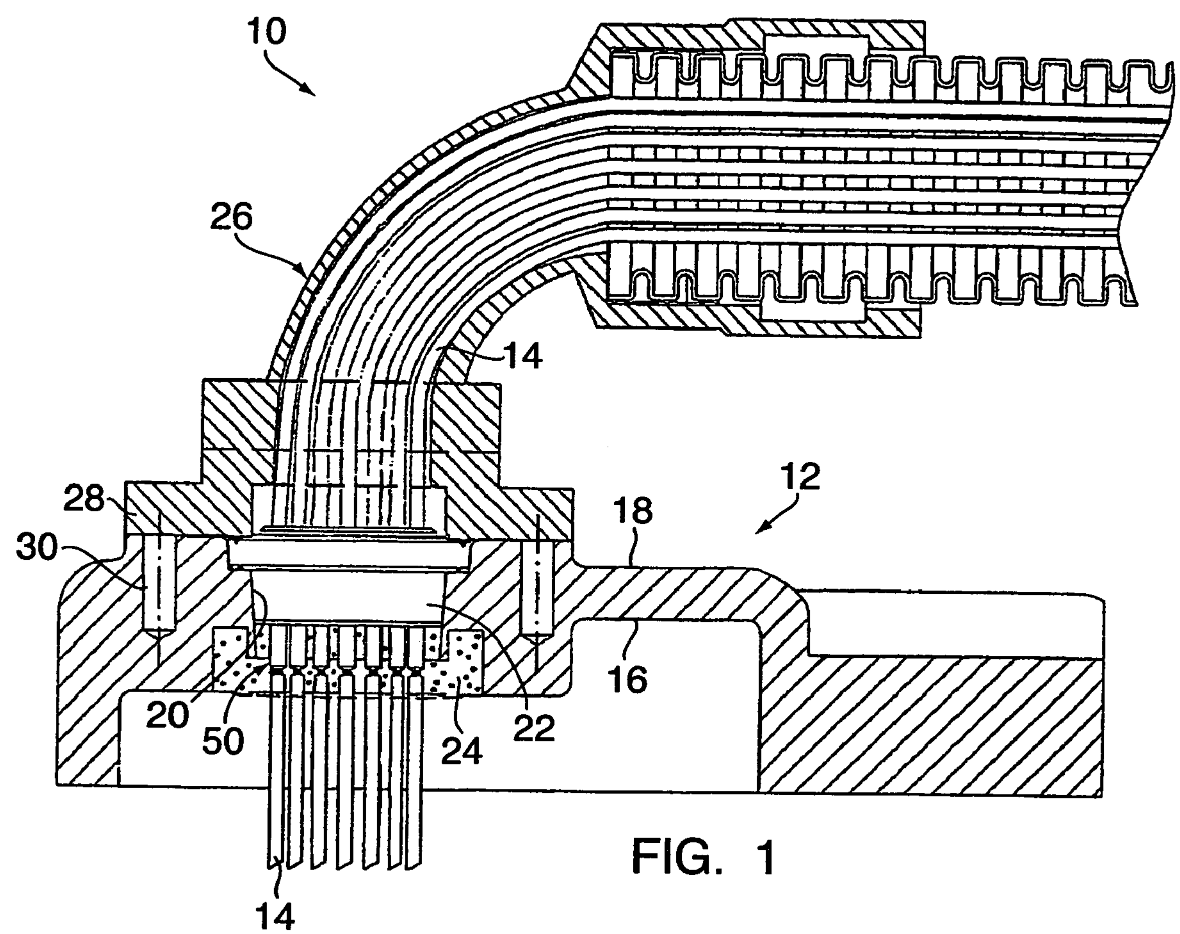
FIG. 1 a cable duct according to the invention in a cross section containing the cable channel axis, FIG. 2 an enlarged portion of FIG. 1, FIG. 3 a plan view of the cable duct of FIG. 1, and FIG. 4 a sealing element in partial cross section with through going electrical conductors.
Figure 3:
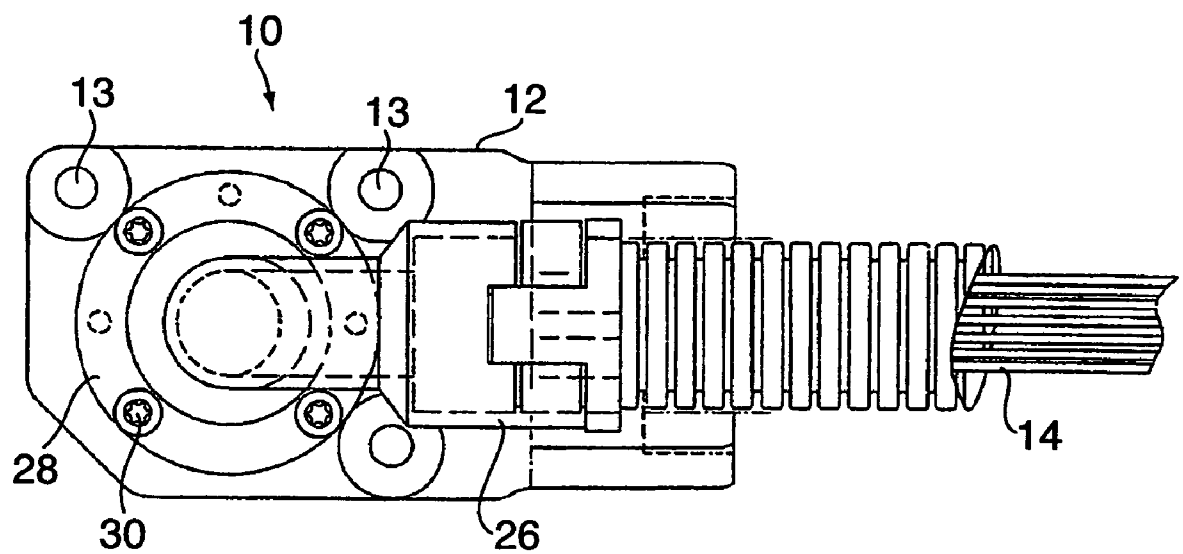

A cable duct 10 according to the invention is shown in FIG. 1 in cross section and in FIG. 3. in a plan view. The cable duct has a duct body 12 by means of which an opening in a motor or drive housing is closed in an oil tight manner, and through which electrical conductors 14 are guided. Non-illustrated threaded bolts which are inserted through openings 13 (see FIG. 3) in the duct body 12 serve to fasten the duct body to the motor or drive housing. The duct body 12 has an inner side 16 exposed to the oil and an outer side 18 separated from the oil. The electrical conductors 14 are guided by a cable channel 20 from the inner side 16 to the outer side 18 of the duct body 12. In this writing, the term “cable channel” means entirely generally the connection between the inner side and the outer side of the duct body, as to the shape of which expressly no limitation should be applied.

A sealing element 22 is arranged in the cable channel 20, which sealing element in FIG. 1 for purposes of clarity is not shown in cross section. In the sealing element 22 are formed individual channels 23, through which the conductors 14 are individually guided (see FIG. 4). The guiding of the conductors 14 through the sealing element 22 is explained in more detail below with reference to FIG. 4. When viewed from the sealing element 22, the cable channel 20 in an inner section, that is in a lower section 24 of the FIG. 1 illustration, is filled with a poured mass (illustrated with dots in FIGS. 1 and 2). Upon escaping from the duct body 12 the conductors 14 are guided in a cable guide tube 26 which by means of a flange 28 is flangedlly connected to the duct body 12 by threaded bolts 30.

Figure 2:
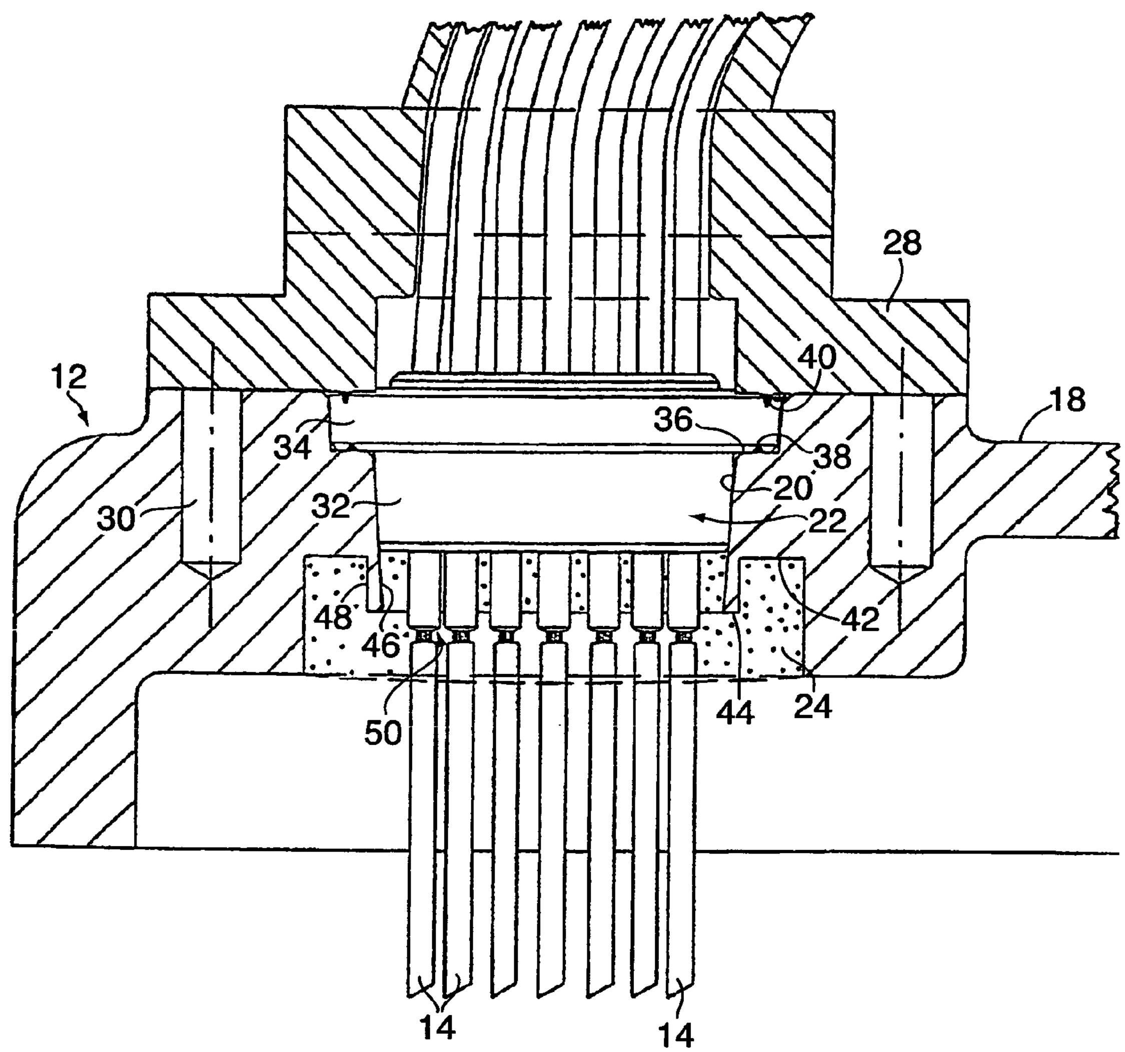

In FIG. 2 is shown a portion of FIG. 1 in enlarged scale. As is there seen, the sealing element 22 has a conical section 32 and a radially outwardly extending section 34. In the cable channel 20 is formed a conical section into which the conical section 32 is complementarily inserted. Further, in the cable channel 20 a recess 36 is formed onto which the projecting section 34 of the sealing element 22 lies. As is to be seen in FIG. 2, the internal diameter of the flange 28 is smaller than the diameter of the projecting section 34 of the sealing element 22. Therefore, the sealing element 22 is pressed into the cable channel 20 when the cable guide tube 26 by way of its flange 28 is threadedly connected to the duct body 12, so that the sealing element 22 lies with its conical section 32 tightly against the wall of the cable channel 20 and closes this in an oil sealing manner. Further, on the recess 36 and on the flange 28 circumferential sealing lips 38 and 40 are formed, which lips likewise hinder the ability of the oil to move from inwardly toward outwardly between the sealing element 22 and the cable channel 20.

As already mentioned above, when viewed from the sealing element 22, a section 24 of the cable channel 20 is filled with a poured mass. The conductors 14 are embedded in the poured mass and are held in position by this material. Further, the cable channel is already sealed by the poured mass to a certain extent, so that only small amounts of oil can basically penetrate to the sealing element 22.

Although the poured mass is very well suited to holding in place the conductors 14, it can not continuously close the cable channel 20 in an oil-tight manner. That is, because it is exposed to high temperature changes, it relatively rapidly ages and thereby shrinks, so that gaps between the cable channel 20 and the poured mass can form. In the cable duct 10 of the invention, the shrinking of the poured mass is taken into account by the profiling of the filled section 24 of the cable channel 20. As is to be seen in FIG. 2, a recess 42 is formed in the filled section of the cable channel 20, in which recess a circumferential annular web 44 is formed. On the inner side 46 of this annular web 44 the above described conical shape of the cable channel 20 is continued. That means, that the filled section 24 of the cable channel 20—as seen in the axial direction from outwardly toward inwardly—narrows in the region surrounded by the annular web 44. Thereby it is avoided that the poured mass can fall out of the cable channel 20, even if it were to be greatly shrunken. The annular web 44 has, among others, the purpose that the filling material in its aging process shrinks onto the outer side 48 of the annular web so that it at least at the boundary surface of the filling material and the outer side 48 of the annular web presents a tight place for oil, through which the oil can pass only with great difficulty.

Figure 4:
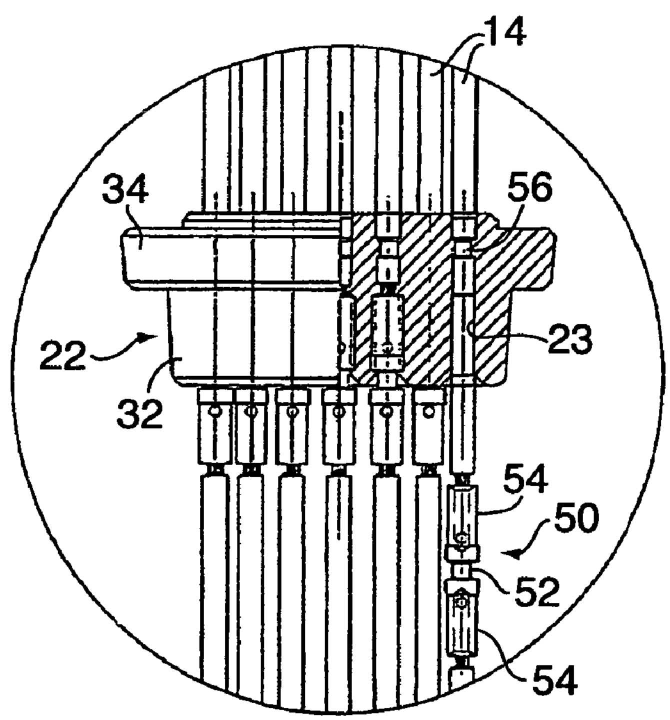

In FIG. 4 the sealing element 22 is shown in a partial cross section through which the electrical conductors 14 are guided in the individual channels 23. As is to be seen in FIG. 4, the electrical conductors each consist of two conductor sections which are connected to one another by a connecting piece 50. Further, a half of the connecting piece is arranged in the individual channel 23 of the sealing element 22. In the illustration of FIG. 4 the conductor lying most to the right is, for the purpose of better illustrating the connecting piece 50, shown to have been pulled somewhat downwardly.

The connecting pieces 50 consist of a pin 52 at each of whose ends is arranged a crimping sleeve 54 for fastening the conductor sections. The pin 52 has a solid cross section and thereby serves as a capillary barrier for oil which permeates to the interior of the inner conductor section. This capillary barrier represents an essential improvement in comparison to the state of the art wherein a stranded conductor is fed from the inner side to the outer side of the duct body and oil can escape to the outside by capillary effect of the stranded conductor.

The connecting pieces 50 permanently close the individual channels 23 in an oil-tight manner, since the sealing element 22 is made of a highly elastic material. As is to be further seen in FIG. 4, in each individual channel 23 is a narrowed portion 56 into which the insulation of the outwardly leading conductor section is squeezed. Thereby the possibility that rain or sprayed water moving into the cable guide tube 26 can penetrate into the individual channels 23 of the sealing element from the outside, and can thereby lead to a short circuit between different conductors, is avoided.

REFERENCE NUMBER LIST

10 cable duct
12 duct body
13 opening for threaded bolts
14 conductor
16 inner side of the duct body 12
18 outer side of the duct body 12
20 cable channel
22 sealing element
23 individual channel
24 pouredly filled section of the cable channel 20
26 cable guide tube
28 flange
30 threaded bolts
32 conical section of the sealing element 22
34 projecting section of the sealing element 22
36 recess
38 sealing lip
40 sealing lip
42 recess
44 annular web
46 inner side of the annular web 44
48 outer side of the annular web 44
50 connecting piece
52 pin
54 crimping sleeve
56 narrowing in the individual channel 23

What is claimed is:

1. A fluid-tight and an oil-tight cable duct comprising: a duct body having a fluid engaging inner side, an outer side separated from the fluid, and at least one cable channel, through which the cable channel at least one electrical conductor formed as a strand is guided from the inner side to the outer side of the duct body, a sealing element being arranged in the cable channel, which said element is penetrated by a number of individual channels corresponding to the number of conductors, through which said individual channels the conductors are individually guided, and that the conductors each consist of two conductor sections which the sections are connected with one another by an electrical conducting connecting piece which said piece along at least a portion of its length has a solid cross section, with the connecting piece along at least said portion of its length is inserted into the corresponding individual channel of the sealing element.

2. A cable duct according to claim 1, wherein the connecting piece is formed from a pin, on each end of the pin a crimping sleeve being arranged.

3. A cable duct according to claim 1, wherein the sealing element is made of an elastomer.

4. A cable duct according to claim 1, wherein the cable channel in a section adjacent to the inner side of the sealing element is filled with a poured material.

5. A cable duct according to claim 4, wherein the filled inner section of the cable channel—as seen in the axial direction from outwardly toward inwardly—narrows in at least one place.

6. A cable duct according to claim 4, wherein a first recess is formed in the cable channel, from which said first recess an annular web extends in the axial direction into the filled section of the cable channel.

7. A cable duct according to claim 1, wherein each of the individual channels in the sealing element has a narrowed section.

8. A cable duct according to claim 1, wherein the sealing element has a tapered section and the cable channel—as seen in the axial direction from outwardly toward inwardly—has a narrowing section into which the sealing element is pressed from outwardly with said tapered section.

9. A cable duct according to claim 1, wherein the sealing element at its axially outwardly facing end has a radially outwardly projecting section, and a second recess is formed in the cable channel in which the projecting section lies.

10. A cable duct according to claim 9, wherein in the second recess is formed a cable axis surrounding a closed sealing lip.

11. A cable duct according to claim 9, further comprising a cable guide tube with a flange for fastening to the outside of the duct body, with the internal diameter of the flange being smaller than the diameter of the projecting section of the sealing element.

12. A cable duct according to claim 11, wherein a cable axis surrounding a closed sealing lip is formed on the flange.

* * * * *